United States Patent
Bates et al.

(10) Patent No.: US 7,979,635 B2
(45) Date of Patent: Jul. 12, 2011

(54) APPARATUS AND METHOD TO ALLOCATE RESOURCES IN A DATA STORAGE LIBRARY

(75) Inventors: Allen Keith Bates, Tucson, AZ (US); Nils Haustein, Soergenloch (DE); Craig Anthony Klein, Tucson, AZ (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 12/031,548

(22) Filed: Feb. 14, 2008

(65) Prior Publication Data

US 2009/0210618 A1   Aug. 20, 2009

(51) Int. Cl.
*G06F 12/16* (2006.01)
(52) U.S. Cl. .................................. 711/114; 711/162
(58) Field of Classification Search .................. None
See application file for complete search history.

(56) References Cited

U.S. PATENT DOCUMENTS

| | | | |
|---|---|---|---|
| 5,313,626 A | 5/1994 | Jones et al. | |
| 5,495,572 A | 2/1996 | Tanaka et al. | |
| 5,822,584 A | 10/1998 | Thompson et al. | |
| 6,000,039 A | 12/1999 | Tanaka et al. | |
| 6,625,748 B1 | 9/2003 | Tanaka et al. | |
| 6,647,514 B1 | 11/2003 | Umberger et al. | |
| 6,715,006 B1 * | 3/2004 | Hotta et al. | 710/45 |
| 6,732,232 B2 | 5/2004 | Krishnamurthy | |
| 6,918,007 B2 * | 7/2005 | Chang et al. | 711/114 |
| 7,058,762 B2 | 6/2006 | Patterson et al. | |
| 7,213,165 B2 | 5/2007 | Umberger et al. | |
| 2004/0059958 A1 * | 3/2004 | Umberger et al. | 714/5 |
| 2006/0143380 A1 * | 6/2006 | Barrall et al. | 711/114 |

FOREIGN PATENT DOCUMENTS

EP      1703397      9/2006

OTHER PUBLICATIONS

Maddock et al., "Surviving Two Disk Failures: Introducing Various 'RAID 6' Implementations," Xyratex Technology Limited, pp. 1-13, United Kingdom.
International Search Report and Written Opinion dated Feb. 18, 2010.

* cited by examiner

*Primary Examiner* — Than Nguyen
(74) *Attorney, Agent, or Firm* — Dale F. Regelman; Quarles & Brady LLP

(57) ABSTRACT

A method to allocate resources in a data storage library comprising a plurality of data storage devices configured as a RAID array, by establishing a normal operation resource allocation, a RAID failure resource allocation, and a multiple storage device failure resource allocation. The method receives host I/O requests, and enqueues those host I/O requests. If the system is operating without any storage device failures, then the method processes host I/O requests using the normal operation resource allocation. If the system is operating with a storage device failure, then the method processes host I/O requests using the RAID failure resource allocation. If the system is operating with multiple storage device failures, then the method processes host I/O requests using the multiple storage device failure resource allocation.

12 Claims, 7 Drawing Sheets

APPARATUS AND METHOD TO ALLOCATE RESOURCES IN A DATA STORAGE LIBRARY

FIELD OF THE INVENTION

This invention relates to an apparatus and method to adjust data storage system resources allocated for foreground and background operations.

BACKGROUND OF THE INVENTION

Computing systems generate information. It is known in the art to store such information using a plurality of data storage media. In a redundant array of independent disks ("RAID") configuration, information is stored in arrays of data storage media to provide fault tolerance and improved data access performance. RAID combines physical data storage media into a single logical unit either by using special hardware or software.

In a RAID 3, 4, 5, or 6 array configuration a process known as "data striping" is used in combination with parity data, i.e. encoded redundant information. In RAID 6, both row stripes and diagonal stripes are used, and one set of parity is associated with each row stripe and another set of parity is associated with each diagonal stripe, for dual redundancy. In RAID 6, row parity may be concentrated in a single row parity storage media, and diagonal parity may be concentrated in a different single diagonal parity storage media, or row and diagonal parity may be distributed across all data storage media in the array. Each RAID stripe comprises a predetermined number of sequential logical block arrays.

By striping data and distributing the parity across all drives in the array, optimum performance is realized by minimizing constant access to a single drive. If a drive fails in a RAID 6 array configuration, data written to the failed drive can be rebuilt using the parity data on the remaining drives. If the array is configured with an online spare drive, the RAID rebuild begins automatically when a failed drive is detected. If the array is not configured with a spare drive, then the RAID rebuild begins after the failed drive is replaced.

To rebuild lost data, each lost stripe is read from the remaining drives in the array. The lost stripe is restored using exclusive-OR ("XOR") operations performed by a RAID controller XOR engine. After the XOR engine restores the lost stripe, that restored stripe is written to the replacement or online spare drive. For RAID levels 3, 4, and 5, the rebuilt process involves (N–1) reads from the operational drives in the array and a single write to the replacement or online spare drive. When a stripe is fully restored, the rebuild process proceeds to restore the next lost stripe. For a double failure under RAID level 6, both row and diagonal stripes are used to construct the drive data being rebuilt to two spare drives. During the rebuild process, the array remains accessible to users. The RAID controller must allocate system resources to process both host I/O requests, access requests received from users, and rebuild I/O requests, i.e. the RAID rebuild procedure.

SUMMARY OF THE INVENTION

The invention comprises a method to allocate resources in a data storage library comprising a plurality of data storage devices configured as a RAID array. The method establishes a normal operation resource allocation, a RAID failure resource allocation, and a multiple storage device failure resource allocation. The method receives host I/O requests, and enqueues those host I/O requests. If the system is operating without any storage device failures, then the method processes host I/O requests using the normal operation resource allocation. If the system is operating with a storage device failure, then the method processes host I/O requests using the RAID failure resource allocation. If the system is operating with multiple storage device failures, then the method processes host I/O requests using the multiple storage device failure resource allocation.

In certain embodiments, the method adjusts previous system resource allocations based upon an actual RAID rebuild rate. In certain embodiments, wherein a first data storage library comprising a first RAID array provides information to a second data storage library comprising a second RAID array, the method adjusts previous system resource allocations based upon a data storage device failure in the first library, or a data storage device failure in the second library.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
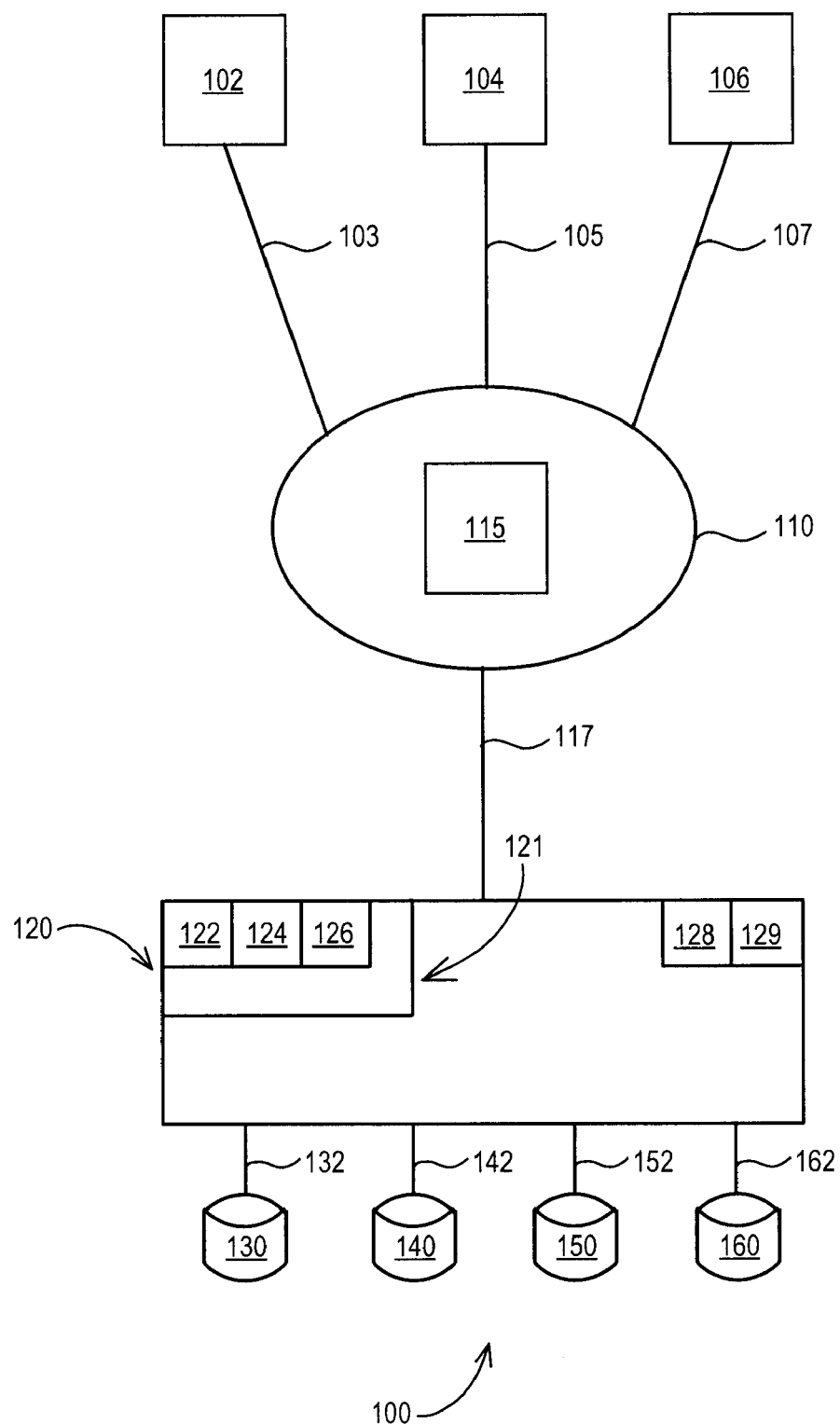
FIG. 1 is a block diagram showing one embodiment of Applicants' data storage system.

In the illustrated embodiment of FIG. 1, computing system 100 comprises RAID controller 120 and data storage media 130, 140, 150, and 160. In the illustrated embodiment of FIG. 1, RAID controller 120 communicates with data storage media 130, 140, 150, and 160, via I/O protocols 132, 142, 152, and 162, respectively. I/O protocols 132, 142, 152, and 162, may comprise any sort of I/O protocol, including without limitation a fiber channel loop, SCSI (Small Computer System Interface), iSCSI (Internet SCSI), SAS (Serial Attach SCSI), Fiber Channel, SCSI over Fiber Channel, Ethernet, Fiber Channel over Ethernet, Infiniband, and SATA (Serial ATA).

By "data storage media," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' RAID controller 120 is in communication with host computers 102, 104, and 106. As a general matter, hosts computers 102, 104, and 106, each comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 102, 104, and/or 106, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, Applicants' RAID controller 120 comprises processor 128, XOR engine 129, memory 121, microcode 122 written to memory 121, and instructions 124 written to memory 121. Processor 128 utilizes microcode 122 to operate RAID controller 120. In the illustrated embodiment of FIG. 1, Applicants' RAID controller 120 further comprises rebuild bitmap 126, wherein rebuild bitmap comprises (N) indicators, and wherein each indicator is associated with a different data stripe. If the (i)th indicator is set to a first value, then the associated data stripe has not been rebuilt, and wherein if the (i)th indicator is set to a second value, then the associated data stripe has been rebuilt, wherein (i) is less than or equal to 1 and greater than or equal to (N).

As those skilled in the art will appreciate, processor 128 is capable of performing a nominal number of instructions per second ("NNIPS"). In addition to processing input/output ("I/O") requests received from one or more host computers, i.e. host I/O requests sometimes referred to as Foreground Operations, processor 128 also performs certain Background Operations such as for example and without limitation, checking and certifying parity, RAID rebuilds, and other "housekeeping" chores. As a result, processor 128 must allocate system resources, such as and with limitation, allocations of processor NNIPS between host I/O requests and Background Operations.

In the illustrated embodiment of FIG. 1, host computers 102, 104, and 106, are connected to fabric 110 utilizing I/O protocols 103, 105, and 107, respectively. I/O protocols 103, 105, and 107, may be any type of I/O protocol; for example, a Fiber Channel ("FC") loop, a direct attachment to fabric 110 or one or more signal lines used by host computers 102, 104, and 106, to transfer information to and from fabric 110.

In certain embodiments, fabric 110 includes, for example, one or more FC switches 115. In certain embodiments, those one or more switches 115 comprise one or more conventional router switches. In the illustrated embodiment of FIG. 1, one or more switches 115 interconnect host computers 102, 104, and 106, to RAID controller 120 via I/O protocol 117. I/O protocol 117 may comprise any type of I/O interface, for example, a Fiber Channel, Infiniband, Gigabit Ethernet, Ethernet, TCP/IP, iSCSI, SCSI I/O interface or one or more signal lines used by FC switch 115 to transfer information through to and from RAID controller 120, and subsequently data storage media 130, 140, 150, and 160. In other embodiments, one or more host computers, such as for example and without limitation host computers 102, 104, and 106, communicate directly with RAID controller 120 using I/O protocols 103, 105, and 107, respectively.

Figure 2A:
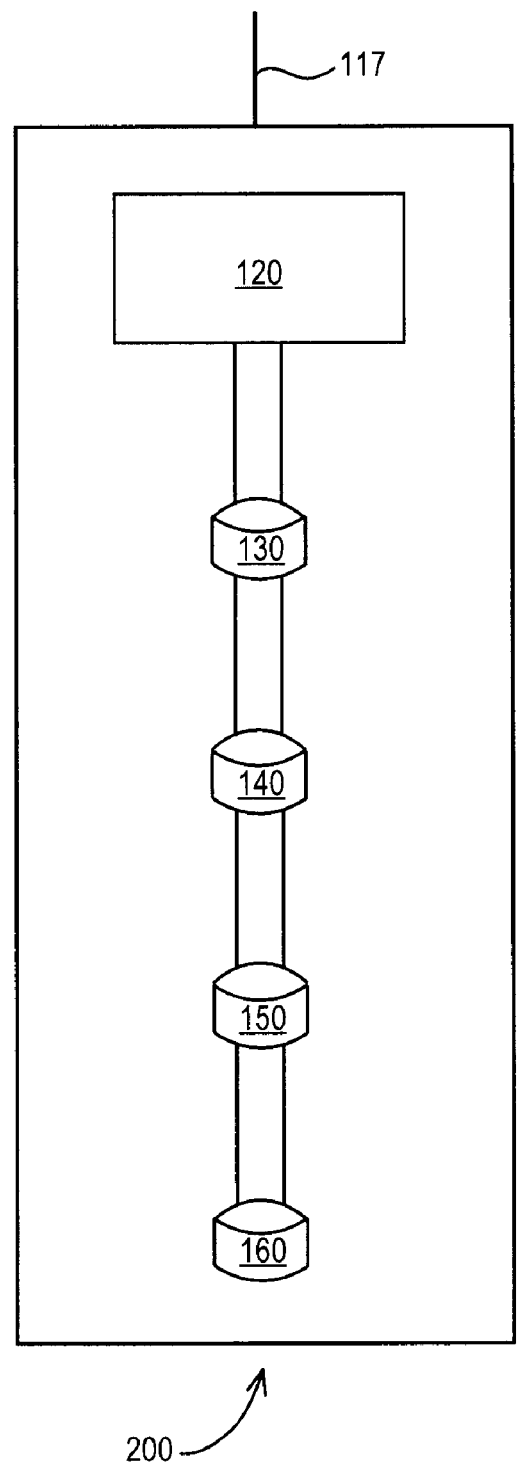
FIG. 2A is a block diagram showing one RAID controller in communication with a plurality of data storage media using a fiber channel arbitrated loop.

In the illustrated embodiment of FIG. 2A, Applicants' RAID controller 120 communicates with data storage media 130, 140, 150, and 160, using a fiber channel arbitrated ("FC-AL") loop of switches, wherein controller 120 and media 130, 140, 150, and 160, are disposed in information storage and retrieval system 200. As those skilled in the art will appreciate, information storage and retrieval system 200 further comprises additional elements, such as and without limitation one or more host adapters, one or more device adapters, a data cache, non-volatile storage, and the like. The illustrated embodiment of FIG. 2A should not be construed to limit Applicants' invention to use of fiber channel networks or devices. In other embodiments, other network topologies and devices are utilized, including without limitation SAS devices and/or SATA devices.

Figure 2B:
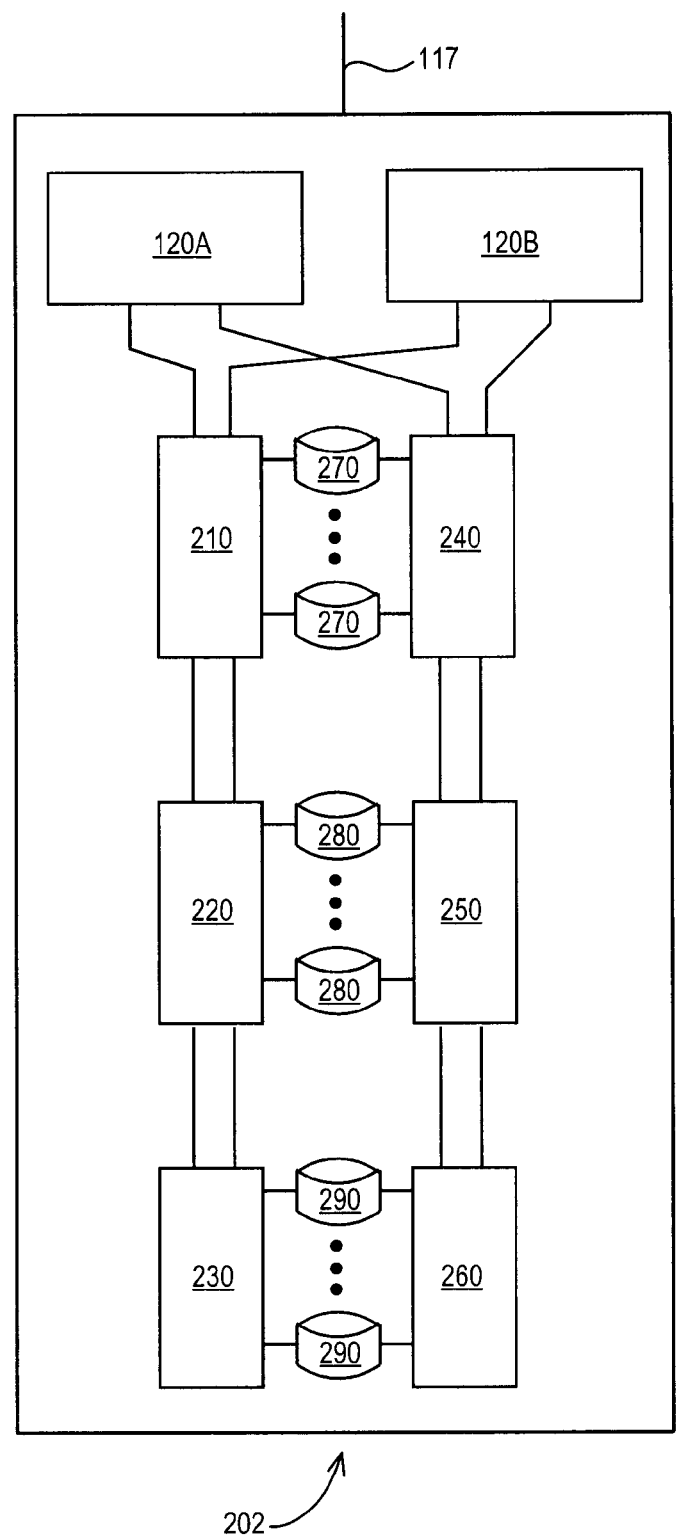
FIG. 2B is a block diagram showing two RAID controllers in communication with a plurality of data storage media using dual fiber channel arbitrated loops.

In the illustrated embodiment of FIG. 2B, Applicants' information storage and retrieval system 202 comprises dual FC-AL loops of switches wherein RAID controller 120A and RAID controller 120B are interconnected with both FC-AL loops. Each FC-AL loop contains one or more local controllers, such as local controllers 210, 220, 230, 240, 250, and 260. As those skilled in the art will appreciate, information storage and retrieval system 200 further comprises additional elements, such as and without limitation one or more host adapters, one or more device adapters, a data cache, non-volatile storage, and the like. In the illustrated embodiment of FIG. 2B, each RAID controller is in communication with a first plurality of data storage media 270, a second plurality of data storage media 280, and a third plurality of data storage media 290.

The illustrated embodiment of FIG. 2B should not be construed to limit Applicants' invention to use of fiber channel networks or devices. In the illustrated embodiment of FIG. 2B, the recitation of two FC-AL loops comprises one embodiment of Applicants' apparatus. In other embodiments, other network topologies and devices are utilized, including without limitation SAS devices and/or SATA devices.

Figure 3:
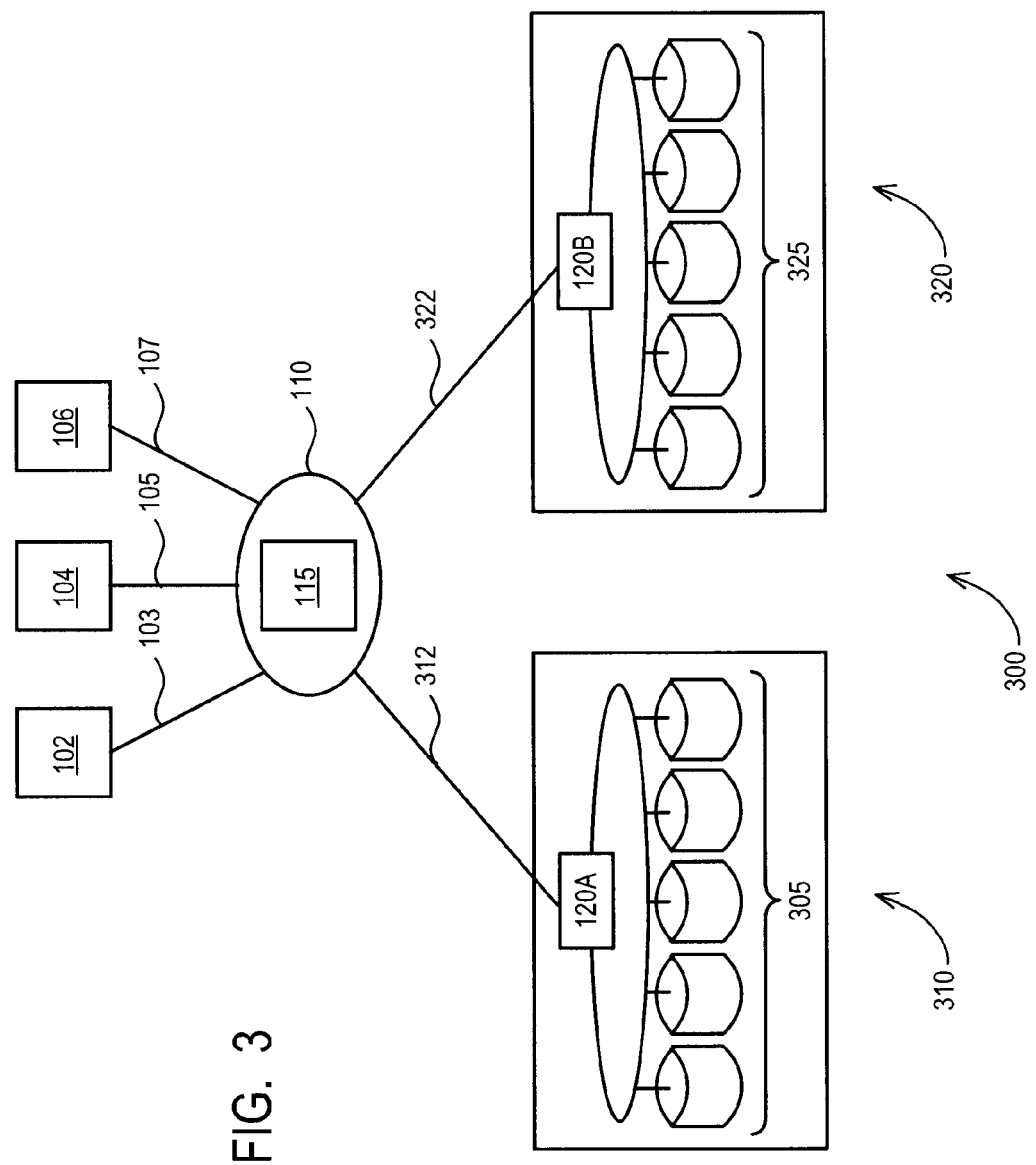
FIG. 3 is a block diagram showing a second embodiment of Applicants' data storage system

FIG. 3 shows a second embodiment of Applicants' data storage system. Referring now to FIG. 3, data storage system 300 comprises host computers 102, 104, and 106, fabric 110, switches 115, first data storage library 310, and second data storage library 320, wherein data storage library 310 copies information from first RAID array 305 to second RAID array 325 using a peer-to-peer copy protocol.

First data storage library 310 comprises RAID controller 120A and RAID array 305. Second data storage library 320 comprises RAID controller 120B and RAID array 325. RAID controller 120A is interconnected with fabric 110 via I/O protocol 312. RAID controller 120B is interconnected with fabric 110 via I/O protocol 322.

I/O protocols 312 and 322 may comprise any type of I/O interface, for example, a Fiber Channel, Infiniband, Gigabit Ethernet, Ethernet, TCP/IP, iSCSI, SCSI I/O interface or one or more signal lines used by FC switch 115 to transfer.

Figure 4:
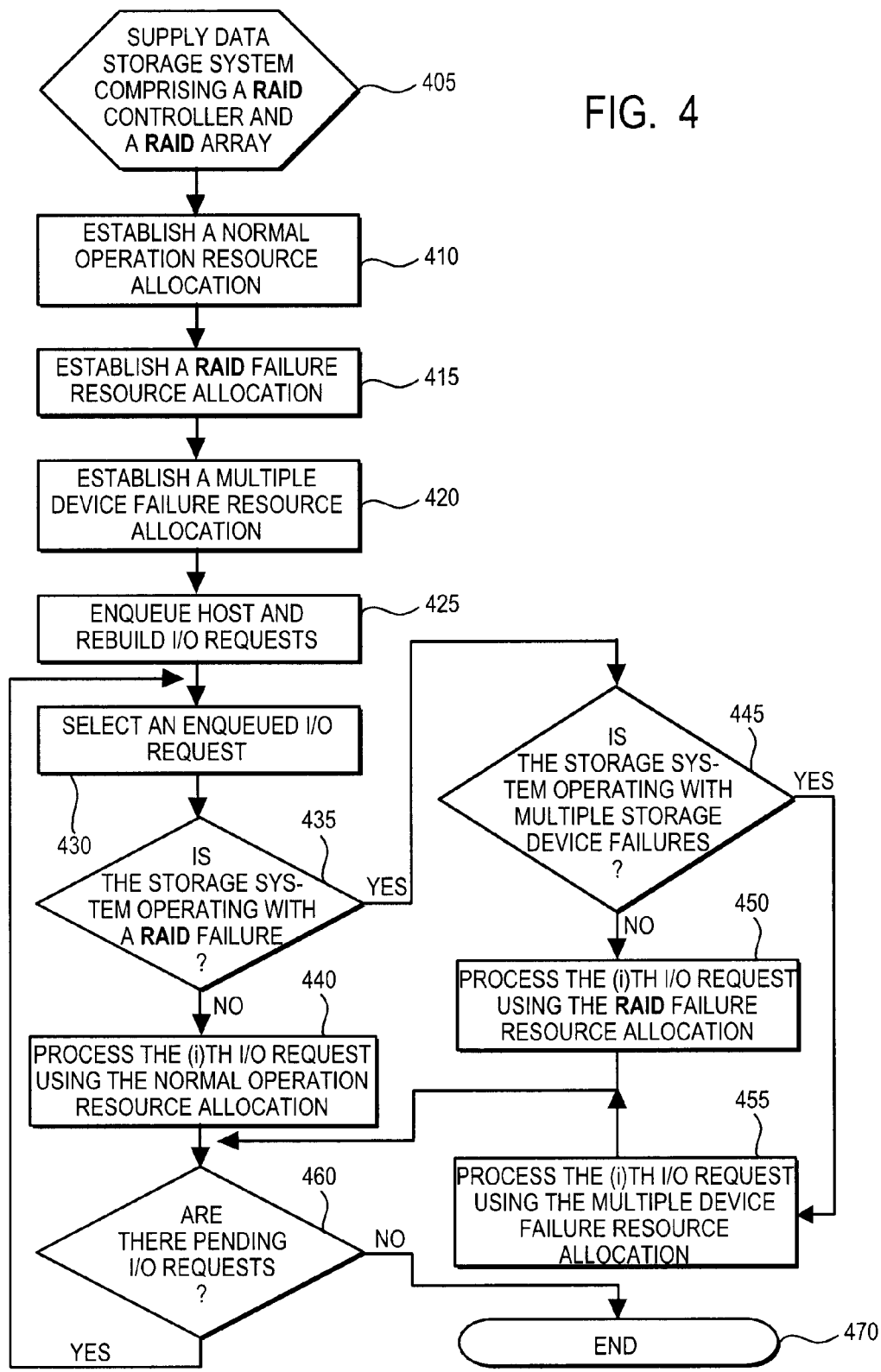
FIG. 4 is a flow chart summarizing certain steps in a first embodiment of Applicants' method.

FIG. 4 summarizes Applicants' method to allocate system resources between host I/O requests and Background Operations. In certain embodiments, Applicants' method summarized in FIG. 4 to allocate system resources between host I/O requests and Background Operations is implemented when using a RAID 6 storage protocol.

Referring now to FIG. 4, in step 405 the method supplies a data storage system comprising a RAID controller and a RAID array, wherein the RAID controller is capable of performing a nominal number of instructions per second ("NNIPS").

In step 410, the method establishes a normal operation resource allocation. In certain embodiments, the normal operation resource allocation of step 410 allocates between about 85 to about 95 percent of a RAID controller's NNIPS to process host I/O requests. In certain embodiments, the normal operation resource allocation of step 410 allocates about 90 percent of a RAID controller's NNIPS to process host I/O requests.

In certain embodiments, a manufacturer of the data storage system of step 405 performs step 410. In certain embodiments, the owner and/or operator of the data storage system of step 405 performs step 410. In certain embodiments, a host computer interconnected with the data storage system of step 405 performs step 410.

In step 415, the method establishes a RAID failure resource allocation. By "RAID failure," Applicants mean a failure of one data storage device configured in a RAID array. In certain embodiments, the RAID failure resource allocation of step 415 allocates between about 40 to about 60 percent of a RAID controller's NNIPS to process host I/O requests. In certain embodiments, the RAID failure resource allocation of step 410 allocates about 50 percent of a RAID controller's NNIPS to process host I/O requests.

In certain embodiments, a manufacturer of the data storage system of step 405 performs step 415. In certain embodiments, the owner and/or operator of the data storage system of step 405 performs step 415. In certain embodiments, a host computer interconnected with the data storage system of step 405 performs step 415.

In step 420, the method establishes a multiple storage device failure resource allocation. In certain embodiments, the multiple storage device failure resource allocation of step 420 allocates between about 4 to about 15 percent of a RAID controller's NNIPS to process host I/O requests. In certain embodiments, the multiple storage device failure resource allocation of step 420 allocates about 10 percent of a RAID controller's NNIPS to process host I/O requests.

In certain embodiments, a manufacturer of the data storage system of step 405 performs step 420. In certain embodiments, the owner and/or operator of the data storage system of step 405 performs step 420. In certain embodiments, a host computer interconnected with the data storage system of step 405 performs step 420.

In step 425, the method receives and enqueues host I/O requests. In certain embodiments, step 425 is performed by a RAID controller. In certain embodiments, step 425 is performed by a host computer.

In step 430, the method selects an enqueued host I/O request. In certain embodiments, step 430 is performed by a RAID controller. In certain embodiments, step 430 is performed by a host computer.

In step 435, the method determines if the data storage system of step 405 is operating with a RAID failure, i.e. whether a data storage device failure has been detected. In certain embodiments, step 435 is performed by a RAID controller. In certain embodiments, step 435 is performed by a host computer.

If the method determines in step 435 that the data storage system of step 405 is not operating with a RAID failure, then the method transitions from step 435 to step 440 wherein the method processes the selected host I/O request of step 430 using the normal operating resource allocation of step 410. In certain embodiments, step 440 is performed by a RAID controller. In certain embodiments, step 440 is performed by a host computer.

In step 460, the method determines if there are pending, i.e. enqueued, host I/O requests. In certain embodiments, step 460 is performed by a RAID controller. In certain embodiments, step 460 is performed by a host computer.

If the method determines in step 460 that there are no pending host I/O requests, then the method transitions from step 460 to step 470 and ends. Alternatively, if the method determines in step 460 that there are pending host I/O requests, then the method transitions from step 460 to step 430 and continues as described herein.

If the method determines in step 435 that the data storage system of step 405 is operating with a RAID failure, then the method transitions from step 435 to step 445 wherein the method determines if the data storage system of step 405 is operating with multiple data storage device failures. In certain embodiments, step 445 is performed by a RAID controller. In certain embodiments, step 445 is performed by a host computer.

If the method determines in step 445 that the data storage system of step 405 is not operating with multiple data storage device failures, then the method transitions from step 445 to step 450 wherein the method processes the selected host I/O request of step 430 using the RAID failure resource allocation of step 415. In certain embodiments, step 450 is performed by a RAID controller. In certain embodiments, step 450 is performed by a host computer. The method transitions from step 450 to step 460 and continues as described herein.

If the method determines in step 445 that the data storage system of step 405 is operating with multiple data storage device failures, then the method transitions from step 445 to step 455 wherein the method processes the selected host I/O request of step 430 using the multiple device failure resource allocation of step 420. In certain embodiments, step 450 is performed by a RAID controller. In certain embodiments, step 450 is performed by a host computer. The method transitions from step 455 to step 460 and continues as described herein.

Figure 5:
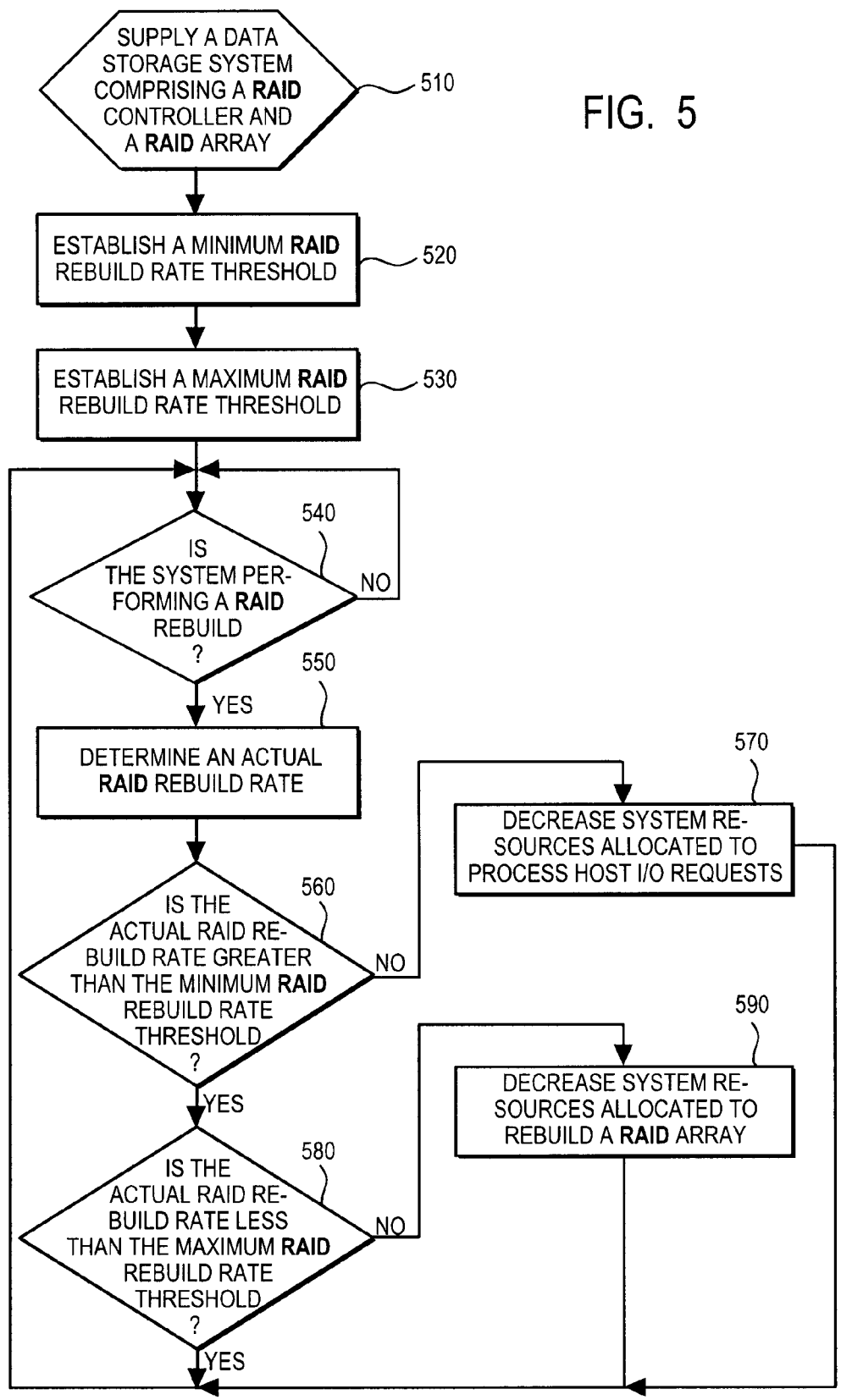
FIG. 5 is a flow chart summarizing certain additional steps in the first embodiment of Applicants' method of Applicants' method.

FIG. 5 summarizes the steps of Applicants' method to adjust an allocation of system resources based upon a RAID rebuild rate. Referring now to FIG. 5, in step 510 the method supplies a data storage system comprising a RAID controller and a RAID array, wherein the RAID controller is capable of performing a nominal number of instructions per second ("NNIPS").

In step 520, the method establishes a minimum RAID rebuild threshold. For example and without limitation, in certain embodiments the method sets in step 520 a minimum RAID rebuild rate of 100 GB per hour. In certain embodiments, a manufacturer of the data storage system of step 510 performs step 520. In certain embodiments, the owner and/or operator of the data storage system of step 510 performs step 520. In certain embodiments, a host computer interconnected with the data storage system of step 510 performs step 520.

In step 530, the method establishes a maximum RAID rebuild threshold. For maximum RAID rebuild rate of 200 GB per hour. In certain embodiments, a manufacturer of the data storage system of step 510 performs step 530. In certain embodiments, the owner and/or operator of the data storage system of step 510 performs step 530. In certain embodiments, a host computer interconnected with the data storage system of step 510 performs step 530.

In step 540, the method determines if the data storage system of step 540 is performing a RAID rebuild. In certain embodiments, step 540 is performed by a RAID controller. In certain embodiments, step 540 is performed by a host computer.

If the method determines in step 540 that a RAID rebuild is not in progress, then the method continues to monitor for a RAID rebuild. Alternatively, if the method determines in step 540 that a RAID rebuild is in progress, then the method transitions from step 540 to step 550 wherein the method determines an actual RAID rebuild rate. In certain embodiments, step 550 is performed by a RAID controller. In certain embodiments, step 550 is performed by a host computer.

In step 560, the method determines if the actual RAID rebuild rate of step 550 is greater than the minimum RAID rebuild rate threshold of step 520. In certain embodiments, step 560 is performed by a RAID controller. In certain embodiments, step 560 is performed by a host computer.

If the method determines in step 560 that the actual RAID rebuild rate of step 550 is not greater than the minimum RAID rebuild rate threshold of step 520, then the method transitions from step 560 to step 570 wherein the method decreases the system resources, such as for example and without limitation a RAID processor NNIPS, allocated for processing host I/O requests. In certain embodiments, step 570 is performed by a RAID controller. In certain embodiments, step 570 is performed by a host computer. The method transitions from step 570 to step 540 and continues as described herein.

If the method determines in step 560 that the actual RAID rebuild rate of step 550 is greater than the minimum RAID rebuild rate threshold of step 520, then the method transitions from step 560 to step 580 wherein the method if the actual RAID rebuild rate of step 550 is less than the maximum RAID rebuild rate threshold of step 530. In certain embodiments, step 580 is performed by a RAID controller. In certain embodiments, step 580 is performed by a host computer.

If the method determines in step 580 that the actual RAID rebuild rate of step 550 is not less than the maximum RAID rebuild rate threshold of step 530, then the method transitions from step 580 to step 590 wherein the method increases the system resources, such as for example and without limitation a RAID processor NNIPS, allocated for processing host I/O requests. In certain embodiments, step 590 is performed by a RAID controller. In certain embodiments, step 590 is performed by a host computer. The method transitions from step 590 to step 540 and continues as described herein. Otherwise, if the method determines in step 580 that the actual RAID rebuild rate of step 550 is less than the maximum RAID rebuild rate threshold of step 530, the method transitions from step 590 to step 540 and continues as described herein.

Figure 6:
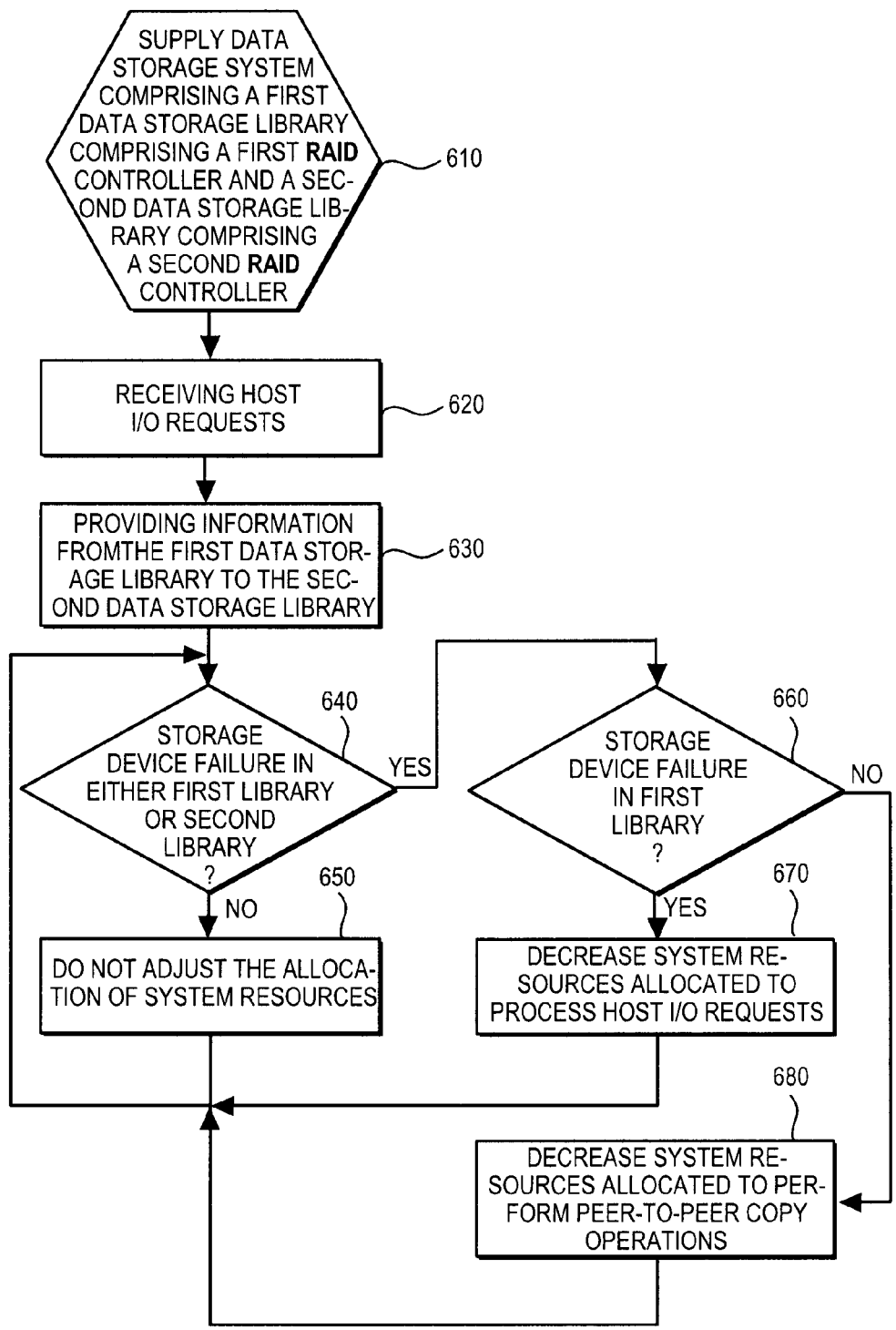
FIG. 6 is a flow chart summarizing certain steps in a second embodiment of Applicants' method.

FIG. 6 summarizes the steps of Applicants' method to adjust an allocation of system resources based upon the failure of a data storage device in either data storage library comprising a peer-to-peer copy relationship. Referring now to FIG. 6, in step 610 the method supplies a data storage system, such as data storage system 300 (FIG. 3), comprising a first data storage library, such as data storage library 310 (FIG. 3), comprising a first RAID controller and a first RAID array, and a second data storage library, such as data storage library 320 (FIG. 3), comprising a second RAID controller and a second RAID array, wherein the first RAID controller is capable of performing a nominal number of instructions per second ("NNIPS").

In step 620, a first RAID controller, such as RAID controller 120A in FIG. 3 receives one or more host I/O requests from an interconnected host computer, such as one or more of host computers 102 (FIGS. 1, 3), 104 (FIGS. 1, 3), and/or 106 (FIGS. 1, 3). The first RAID controller performs step 620 utilizing previously determined host I/O request allocation of system resources, such as and without limitations an host I/O request NNIPS allocation.

In step 630, the first RAID controller provides information to the second RAID controller using a peer-to-peer copy protocol. The first RAID controller performs step 630 utilizing a previously determined peer-to-peer copy allocation of system resources, such as and without limitations a peer-to-peer copy NNIPS allocation.

In step 640, the first RAID controller determines if there is a storage device failure in the first data storage library of step 610 or in the second data storage library of step 610. If the first RAID controller determines in step 640 that no data storage devices have failed in either the first data storage library or in the second data storage library, then the method transitions from step 640 to step 650 wherein the first RAID controller does not adjust the allocated host I/O request system resources or the allocated peer-to-peer copy system resources. The method transitions from step 650 to step 640 and continues as described herein.

If the first RAID controller determines in step 640 that a data storage device has failed in either the first data storage library or in the second data storage library, then the method transitions from step 640 to step 660 wherein the first RAID controller determines if a data storage device in the first data storage library has failed.

If the first RAID controller determines in step 660 that a data storage device in the first data storage library has failed, then the method transitions from step 660 to step 670 wherein the first RAID controller decreases the system resources allocated for processing host I/O requests. The method transitions from step 670 to step 640 and continues as described herein.

If the first RAID controller determines in step 660 that a data storage device in the first data storage library has not failed, then the method transitions from step 660 to step 680 wherein the first RAID controller decreases the system resources allocated for performing peer-to-peer copy operations. The method transitions from step 680 to step 640 and continues as described herein In certain embodiments, individual steps recited in FIGS. 4, 5, and 6, may be combined, eliminated, or reordered.

In certain embodiments, Applicants' invention includes instructions, such as instructions 124 (FIG. 1), residing in computer readable medium, such as for example memory 121

(FIG. 1 wherein those instructions are executed by a processor, such as processor 128 (FIG. 1), to perform one or more of steps 425, 430, 435, 440, 445, 450, 455, 460, and/or 470, recited in FIG. 4, and/or one or more of steps 540, 550, 560, 570, 580, and/or 590, recited in FIG. 5, and/or one or more of steps 620, 630, 640, 650, 660, 670, and/or 680, recited in FIG. 6.

In other embodiments, Applicants' invention includes instructions residing in any other computer program product, where those instructions are executed by a computer external to, or internal to, data storage systems 100 (FIG. 1) or 300 (FIG. 3), to perform one or more of steps 425, 430, 435, 440, 445, 450, 455, 460, and/or 470, recited in FIG. 4, and/or one or more of steps 540, 550, 560, 570, 580, and/or 590, recited in FIG. 5, and/or one or more of steps 620, 630, 640, 650, 660, 670, and/or 680, recited in FIG. 6. In either case, the instructions may be encoded in an information storage medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to allocate resources in a data storage library comprising a plurality of data storage devices configured as a RAID array, said data storage library comprising a RAID controller in communication with a host computer and interconnected to said plurality of data storage device, wherein said RAID controller is capable of performing a nominal number of instructions per second, comprising the steps of:
    establishing a normal operation resource allocation;
    establishing a RAID failure resource allocation; establishing a multiple storage device failure resource allocation;
        receiving host I/O requests;
        enqueuing said host I/O requests;
        selecting an enqueued host I/0 request;
        determining if said RAID array is operating with a RAID failure;
        operative if said RAID array is not operating with a RAID failure, processing said selected host I/O request using said normal operation resource allocation;
        operative if said RAID array is operating with a RAID failure, determining if said RAID array is operating with multiple storage device failures;
        operative if said RAID array is operating with a RAID failure but not with multiple storage device failures, processing said elected host I/O request using said RAID operation resource allocation;
        establishing a minimum RAID rebuild rate threshold;
        establishing a maximum RAID rebuild threshold;
        determining an actual RAID rebuild rate;
        determining if said actual RAID rebuild rate is greater than said minimum RAID rebuild rate threshold;
        operative if said actual RAID rebuild rate is not greater than said minimum RAID rebuild rate threshold, adjusting said RAID failure resource allocation to decrease the system resources allocated for processing of host I/0 requests.

2. The method of claim 1, wherein said normal operation resource allocation allocates between about 85 percent to about 95 percent of said nominal number of instructions per second to processing host I/O requests.

3. The method of claim 1, wherein said RAID failure operation resource allocation allocates between about 40 percent to about 60 percent of said nominal number of instructions per second to processing host I/O requests.

4. The method of claim 1, further comprising the step of processing said elected host I/O request using said multiple storage device failure operation resource allocation if said RAID array is operating with multiple storage device failures.

5. The method of claim 4, wherein said multiple storage device failure operation resource allocation allocates between about 5 to about 15 percent of said nominal number of instructions per second to processing host I/O requests.

6. The method of claim 1, further comprising the steps of:
    operative if said actual RAID rebuild rate is greater than said minimum RAID rebuild rate threshold, determining if said actual RAID rebuild rate is less than said maximum RAID rebuild rate;
    operative if said actual RAID rebuild rate is not less than said maximum RAID rebuild rate threshold, adjusting said RAID failure resource allocation to decrease the system resources allocated for a RAID rebuild.

7. A RAID controller comprising a processor capable of a nominal number of instructions per second and a computer readable medium comprising a normal operation resource allocation, a RAID failure resource allocation, a multiple storage device failure resource allocation, and computer readable program code disposed therein to allocate a percentage of said nominal number of instructions per second to processing host I/O requests, wherein said RAID controller is in communication with a host computer and interconnected with a plurality of data storage media configured as a RAID array, the computer readable program code comprising a series of computer readable program steps to effect:
    receiving host I/O requests;
    enqueuing said host I/O requests;
    selecting an enqueued host I/O request;
    determining if said RAID array is operating with a RAID failure;
    operative if said RAID array is not operating with a RAID failure, processing said selected host I/0 request using said normal operation resource allocation;
    operative if said RAID array is operating with a RAID failure, determining if said RAID array is operating with multiple storage device failures;
    operative if said RAID array is operating with a RAID failure but not with multiple storage device failures, processing said elected host I/0 request using said RAID failure operation resource allocation;
    establishing a minimum RAID rebuild rate threshold;
    establishing a maximum RAID rebuild threshold;
    determining an actual RAID rebuild rate;
    determining if said actual RAID rebuild rate is greater than said minimum RAID rebuild rate threshold;
    operative if said actual RAID rebuild rate is not greater than said minimum RAID rebuild rate threshold, adjusting said RAID failure resource allocation to decrease the system resources allocated for processing of host I/O requests.

8. The RAID controller of claim 7, said computer readable program code further comprising a series of computer readable program steps to effect processing said selected host I/O request using said multiple storage device failure operation resource allocation if said RAID array is operating with multiple storage device failures.

9. The RAID controller of claim 7, said computer readable program code further comprising a series of computer readable program steps to effect:
operative if said actual RAID rebuild rate is greater than said minimum RAID rebuild rate threshold, determining if said actual RAID rebuild rate is less than said maximum RAID rebuild rate;
operative if said actual RAID rebuild rate is not less than said maximum RAID rebuild rate threshold, adjusting said RAID failure resource allocation to decrease the system resources allocated for a RAID rebuild.

10. A computer program product encoded in a computer readable medium, said computer program product being useable by a RAID controller comprising a processor capable of a nominal number of instructions per second and a computer readable medium comprising a normal operation resource allocation, a RAID failure resource allocation, a multiple storage device failure resource allocation, wherein said RAID controller is in communication with a host computer and interconnected with a plurality of data storage media configured as a RAID array, comprising:
computer readable program code which causes said programmable computer processor to receive host I/O requests;
computer readable program code which causes said programmable computer processor to enqueue said host I/O requests;
computer readable program code which causes said programmable computer processor to select an enqueued host I/O request;
computer readable program code which causes said programmable computer processor to determine if said RAID array is operating with a RAID failure;
computer readable program code which, if said RAID array is not operating with a RAID failure, causes said programmable computer processor to process said selected host I/O request using said normal operation resource allocation;
computer readable program code which, if said RAID array is operating with a RAID failure, causes said programmable computer processor to determine if said RAID array is operating with multiple storage device failures;
computer readable program code which, if said RAID array is operating with a RAID failure but not with multiple storage device failures, causes said programmable computer processor to process said elected host I/O request using said RAID failure operation resource allocation;
establishing a minimum RAID rebuild rate threshold;
establishing a maximum RAID rebuild threshold;
determining an actual RAID rebuild rate;
determining if said actual RAID rebuild rate is greater than said minimum RAID rebuild rate threshold;
computer readable program code which, if said actual RAID rebuild rate is not greater than said minimum RAID rebuild rate threshold, causes said programmable computer processor to adjust said RAID failure resource allocation to decrease the system resources allocated for processing of host I/0 requests.

11. The method of claim 10, further comprising computer readable program code which causes said programmable computer processor to process said selected host I/O request using said multiple storage device failure operation resource allocation if said RAID array is operating with multiple storage device failures.

12. The method of claim 10, further comprising
computer readable program code which, if said actual RAID rebuild rate is greater than said minimum RAID rebuild rate threshold, causes said programmable computer processor to determine if said actual RAID rebuild rate is less than said maximum RAID rebuild rate;
computer readable program code which, if said actual RAID rebuild rate is not less than said maximum RAID rebuild rate threshold, causes said programmable computer processor to decrease the system resources allocated for a RAID rebuild.

* * * * *